June 9, 1936.  T. B. TYLER  2,043,785
CLUTCH ACTUATOR
Filed June 2, 1932  4 Sheets-Sheet 1
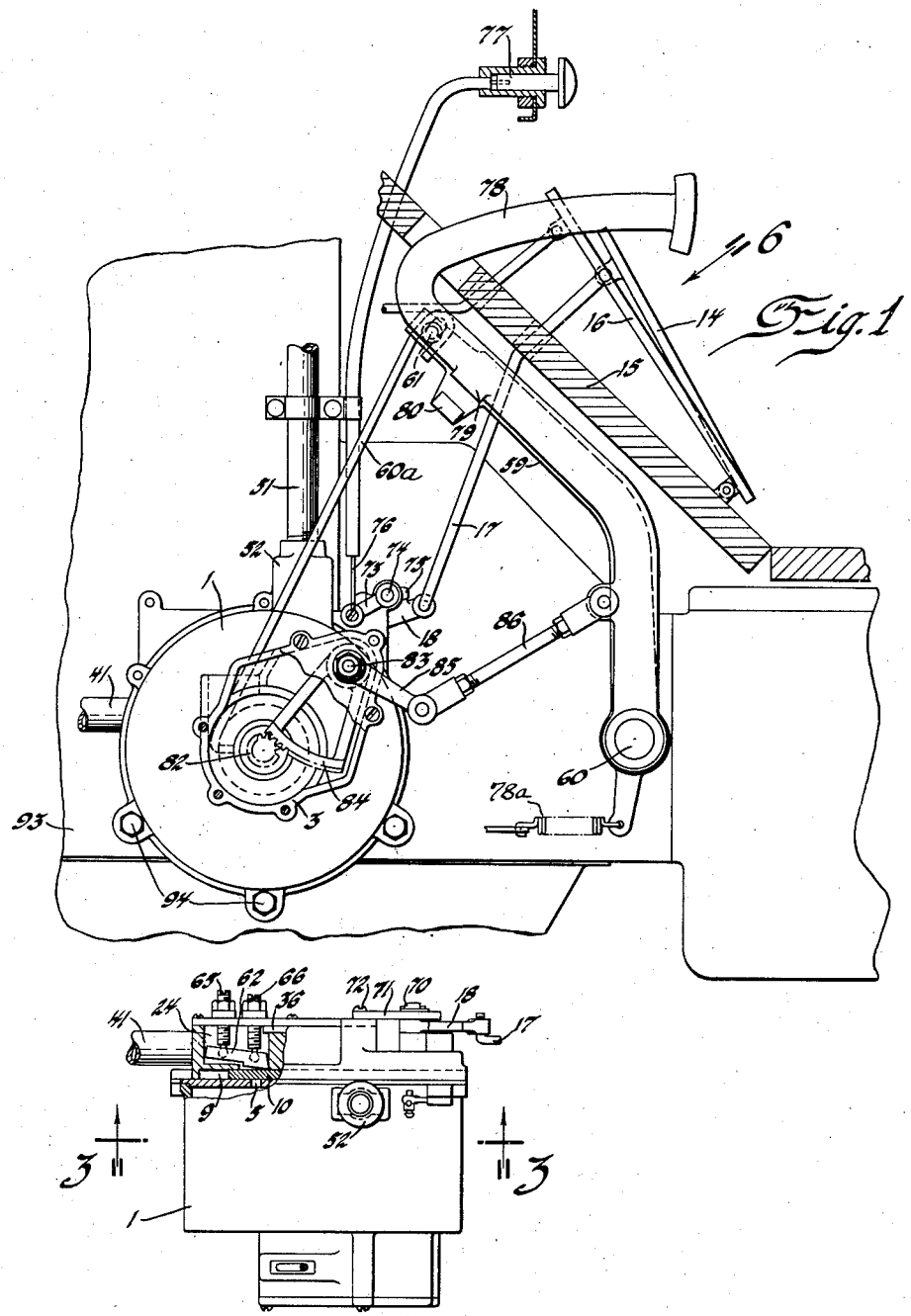
INVENTOR
Tracy Brooks Tyler
BY
ATTORNEY June 9, 1936.	T. B. TYLER	2,043,785
CLUTCH ACTUATOR
Filed June 2, 1932	4 Sheets-Sheet 2
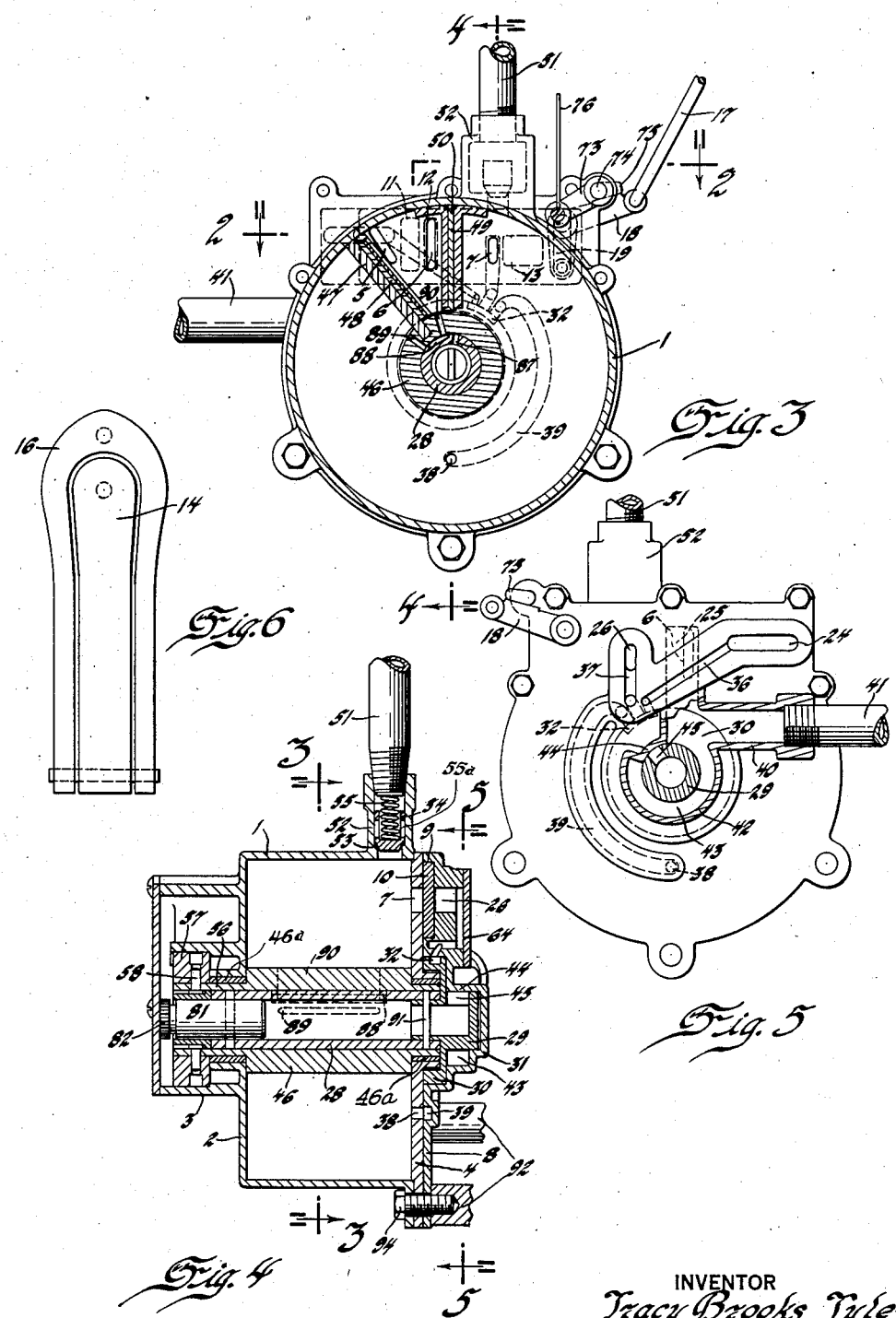
INVENTOR
Tracy Brooks Tyler
BY
ATTORNEY INVENTOR
Tracy Brooks Tyler
BY
ATTORNEY June 9, 1936. T. B. TYLER 2,043,785
CLUTCH ACTUATOR
Filed June 2, 1932 4 Sheets-Sheet 4

INVENTOR
Tracy Brooks Tyler
BY
ATTORNEY

Patented June 9, 1936

2,043,785

UNITED STATES PATENT OFFICE 2,043,785

CLUTCH ACTUATOR

Tracy Brooks Tyler, Detroit, Mich., assignor to The Monopower Corporation, Detroit, Mich., a corporation of Michigan Application June 2, 1932, Serial No. 614,946

11 Claims. (Cl. 192—.01)

The present invention pertains to a novel power means for the automatic or semi-automatic actuation of pressure clutches and is directed particularly to actuators for clutches of motor vehicles.

The principal object of the invention is to provide a clutch actuator of this character that may be operated by any pressure medium such as free atmosphere. When the pressure medium employed is a fluid at atmospheric pressure, the pressure differential for operating the device is preferably, although not necessarily, obtained by connecting the low pressure side of the device to the intake manifold of the engine. On the other hand, any suitable pressure reducing means independent of the motor may be employed.

Another object of the invention is to provide for the operation of the actuator through a distinct manipulating or operating pedal independent of and adjacent to the throttle pedal of the vehicle. The pedals are relatively positioned so that they may be operated together with one foot or independently of each other, if desired. As a result of this arrangement, it is possible for the operator to actuate the throttle pedal without actuating the operating pedal, so that the motor may be accelerated without automatically changing the condition of the clutch and so that the clutch may be operated without affecting the engine.

A further object of the invention is to control the rate of clutch engagement, and this is accomplished by the use of an adjustable bleeder or escape valve which is operative in the fluid system during clutch engagement.

A still further object is to provide an actuator wherein the pressure in that part of the cylinder ahead of the piston or vane may be, and often is relieved before the piston or vane advances for clutch engagement. An actuator so constructed is of particular importance when used in conjunction with a means for postponing the clutch engagement until a certain desirable synchronization takes place, a means such as is shown in my application Serial No. 612,195 filed May 19, 1932. Since the actuator permits that part of the cylinder ahead of the piston to be relieved even while the piston is not advancing, the piston can advance immediately and rapidly, when permitted to do so, without opposition from fluid ahead of it.

Still another object of the invention is to provide a clutch actuator which, when operated by power, does not cause movement of a conventional clutch pedal, although it permits clutch disengagement by pressure on a conventional pedal when desired. This arrangement avoids the hazard of injury to the foot of the operator resulting from a forceful downward pull on a pedal in the footboard of the vehicle.

Another object of the invention is to provide for automatic lubrication of the working parts of the actuator, and this is accomplished, when the device is operated by atmospheric pressure, by connecting the air inlet pipe to the air space of the engine crank case, whereby the air delivered to the actuator is charged with oil vapors from the crank case. A further object of this particular arrangement is to clear the air of dirt and other foreign particles before it enters the actuator.

Still another object of the invention is to provide means for cutting out the power actuator and thereby permitting clutch operation from the aforementioned conventional clutch pedal when desired. In connection with this feature of the invention, it is also an object of the invention to enable the power actuator to reduce the effort required in operating the clutch from the conventional clutch pedal. Accordingly, the conventional clutch pedal is adapted to set the power actuator to the extent of reducing the effort required in operating the clutch. In other words, the power actuator functions as a booster in this instance.

The invention is fully disclosed by way of example in the following description and in the accompanying drawings, in which, Figure 1 is a side elevation, partly in section, of the complete installation;

Fig. 2 is a plan section on the line 2—2 of Figure 3;

Fig. 3 is a vertical section on the line 3—3 of Figs. 2 and 4;

Fig. 4 is a section on the line 4—4 of Fig. 3;

Fig. 5 is a section on the line 5—5 of Fig. 4;

Fig. 6 is a plan view of the throttle pedal and clutch manipulating pedal;

Reference to these views will now be made by use of like characters which are employed to designate corresponding parts throughout.

Figure 7:
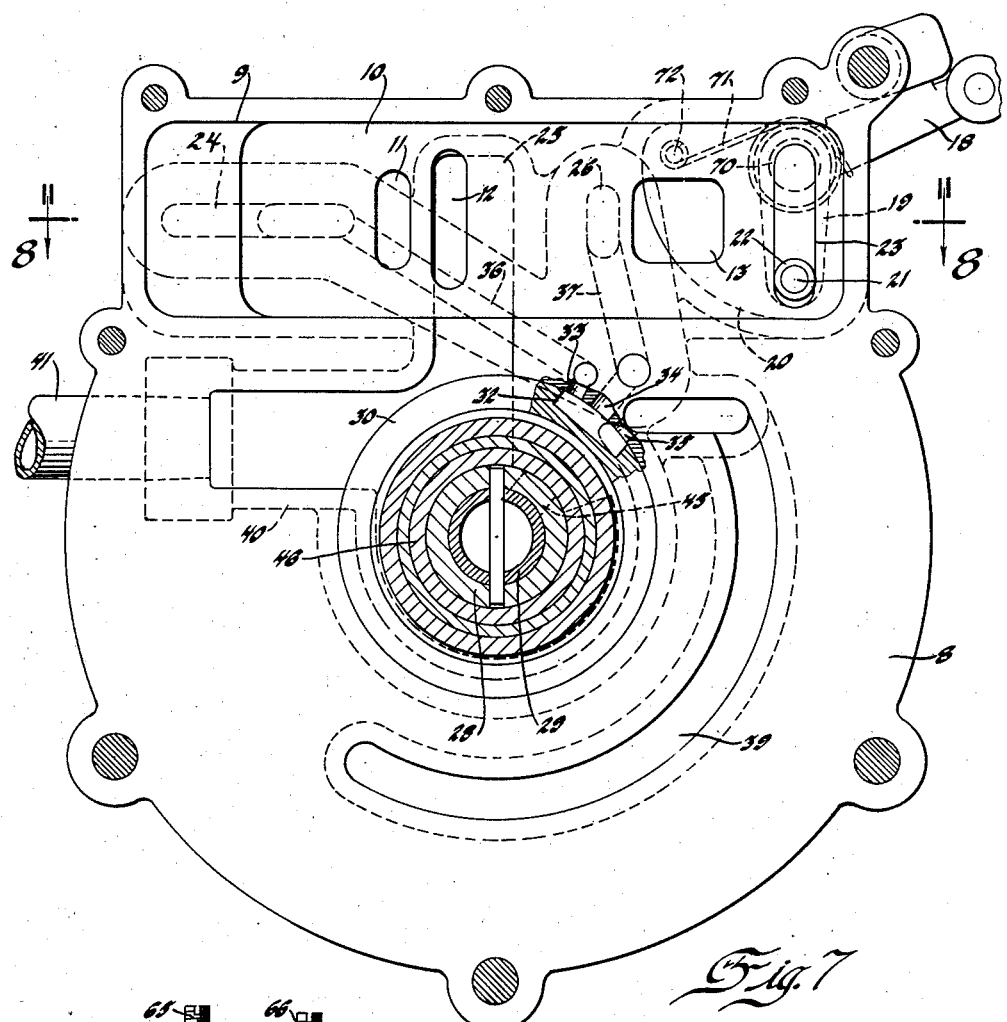
Fig. 7 is a vertical section on the line 7—7 of Fig. 8.
Figure 8:
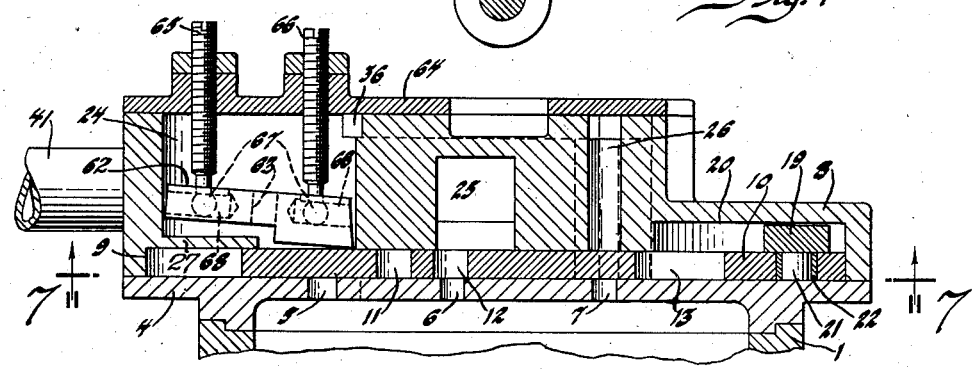
Fig. 8 is a detail plan section on the line 8—8 of Fig. 7.

As indicated in Figs. 1 to 8, and particularly Fig. 4, the body of the device comprises a main cylinder 1 which is open at one end and formed at the other end with an end wall 2 from which extends an outward flange 3 defining a space adapted to accommodate parts that will later be described. Over the opposite and open end of the cylinder 1 is applied a fixed wall plate 4 (Figs. 4 and 8) formed with three ports 5, 6, and 7 arranged in alignment, as shown. Normally when the device is installed, the ports 6 and 7 stand vertically, and the end port 5 stands in an an oblique position as may be seen in Figure 3, for a purpose which will presently appear.

At the outer side of the plate 4 is secured a cover plate 8 formed with a depression 9 embracing the ports 5, 6, and 7. Within the depression is slidably mounted a rectangular valve plate 10 formed with three slots 11, 12 and 13 cooperating with the ports 5, 6 and 7 respectively in the plate 4.

The valve plate 10 is slidably mounted and is actuated from an operating or manipulating pedal 14 (Figure 1) pivoted on the floorboard 15 within a U-shaped throttle pedal 16. A connecting rod 17 extends from the pedal 14 and is connected at its lower end to a crank 18 which in turn is connected to a suspended lever 19 (Figures 7 and 8) to form, in effect, a bell crank. This lever is received in an enlargement 20 of the depression 9 and carries at its lower end a pin 21 on which is mounted a roller sleeve 22. The pin and sleeve are received in a vertical slot 23 in the valve plate 10, so that depression of the pedal 14 moves the valve plate 10 to the left as viewed in Figures 7 and 8, and vice versa.

The cover plate 8 is formed with a bleeder valve chamber 24, an inlet chamber 25 and a passage 26 lying respectively adjacent the ports 5, 6, and 7 of the plate 4 and in controlled communication therewith through the valve plate 10. A blind portion 27 extends from the marginal wall of the cover plate to form a partial wall for the chamber 24.

A tubular sleeve 28 is journaled in the wall 2 and plate 4, coaxially with the cylinder 1, and has a valve member 29 secured to one end thereof and lying at the outer surface of the plate 4. The peripheral portion 30 of the valve member is closely surrounded by a hub portion 31 of the cover plate 8. The member 29 is formed with a recess 32 in its peripheral portion 30, and this recess lies directly beneath three passages 33, 34, 35 in the hub of the cover plate 8, as may be seen in Figure 7. The bleeder or relief valve chamber 24 is placed in communication with the passage 33 by another passage 36 formed in the body of the cover plate. Similarly, the passage 26 communicates with the passage 34 by a passage 37 formed in the cover plate. Another port 38 is drilled through the fixed wall plate 4 and is brought into communication with the passage 35 by means of a groove 39 formed in the adjacent face of the cover plate.

The cover plate is further formed with an integral fitting 40 (Figure 5) extending from the inlet chamber 25 and adapted to receive a pipe 41 for supplying fluids at atmospheric pressure to the inlet chamber. At the juncture of the walls of the chamber 25 and fitting 40, the cover plate is formed with a curved wall 42 defining a space 43 around the valve member 29 and having a drop or seat 44 which normally covers a slot 45 in the valve member.

A hollow shaft 46 is mounted on bushings 46a in the wall 2 and plate 4 and has its end shoulders fitted and sealed closely against the wall and plate respectively as may be seen in Figure 4. A radial and movable vane 47 extends from the shaft 46 and is sealed against the peripheral and end walls of the cylinder by a suitable washer 48. Another radial vane 49 is fixed to the peripheral wall of the cylinder between slots 6 and 7 and is fitted with a suitable packing 50 engaging the end walls of the cylinder and the periphery of the shaft 46. When the valve plate 10 is in the retracted position shown in Figures 7 and 8, with the engine not running, the vane 47 lies at the outer side of the inclined slot 5. The smaller part of the cylinder between the vanes is the high pressure side, being adapted for communication with the inlet pipe 41 in a manner presently to be described, and the remainder of the cylinder is the low pressure side. This side is at all times exhausted through a conduit 51 connected to a fitting 52 extending from the cylinder 1. In the fitting is a slidable valve 54 and a formed valve seat 53 on which valve 54 is adapted to be seated by a coil spring 55, the valve having ports 55a through which the fluid passes.

When atmosphere is used as the fluid medium, the exhaust line 51 is connected to a suitable suction device such as the intake manifold of an automobile engine. The check valve 54 is especially desirable when the device is operating under atmospheric pressure, in order to prevent a sudden variation of engine suction from being translated into or causing vane retraction.

The shaft 46 has a reduced extension 56 projecting into the space defined by the flange 3 and is there fitted with a grooved pulley 57 held thereto by pins 58. A clutch actuating lever 59 (Figure 1) is pivoted through a clutch throw shaft 60, to a suitable external support such as the clutch housing of a motor vehicle, and a cable 60a is wound in the groove of the pulley 57 and has one end secured by a clamp 61 to the free end of the lever 59.

In the bleeder or relief valve chamber 24 is mounted a bleeder or relief valve 62 closely fitted therein and formed with a passage 63. An end plate 64 is secured over the cover plate 8 to enclose chambers and passages formed in the outer face of the cover plate, and through the end plate are threaded two screws 65 and 66 formed with ball ends 67 adapted to move in slots 68 in the ends of the bleeder valve 62.

The pivot shaft 70 which connects the members 18 and 19 and to which they are secured, has a coiled clock-type spring 71 (Figures 2 and 7) surrounding it, the ends of the spring being secured respectively to the shaft 70 and to a stud 72 fixed to the cover plate. This spring tends to retract the valve plate 10 to the position shown in Figure 8 and to move the operating pedal 14 to the position shown in Figure 1.

In the operation of the device as thus far described, assuming that the device is operating by atmosphere and suction, air at atmospheric pressure is delivered through the inlet line 41 to the fitting 40 and inlet chamber 25, while suction acting in the line 51 and through the valve seat 53 tends to exhaust the cylinder 1 except for that small portion thereof sealed off by and between the vanes 47 and 49. Air flows from the inlet chamber 25 through the registering ports 12 and 6 and thus into the small space between the vanes, which is the high pressure side previously mentioned. The pressure differential between the high and low pressure sides causes the vane 47 to move counterclockwise as viewed in Figure 3, whereby the shaft 46 turns in the same direction. The pulley 57 carried by the shaft winds the cable 60a and pulls the clutch lever 59 against the pressure of the usual clutch springs whereupon the clutch is disengaged. The motor develops sufficient suction in its intake manifold, during idling or running, to operate the device in the manner described, so that the clutch is disengaged while the motor is running, until caused to become engaged by moving of the valve plate 10 to the left as will presently appear.

In normal operation, it is first necessary to depress the pedal 14. This movement of the pedal 14 shifts the valve plate 10 to the left with reference to Figure 8, thereby connecting the passages 7 and 26 through the slot 13, obstructing the inlet 25 from the port 6 and connecting the chamber 24 to the slot 5 through the bleeder path by the slot 11. The high pressure side of the cylinder is thus cut off from its inlet and at the same time brought into communication with the chamber 24 through the slot 5 and port 11. The chamber 24 at the same time communicates with the low pressure side and hence with the exhaust line 51, through passages 36 and 33, recess 32, passages 34, 37 and 26, port 13 and slot 7. The high pressure side of the cylinder, clockwise of vane 47, is thus exhausted whereupon the clutch springs are enabled to function to engage the clutch, inasmuch as there is no resistance to movement of the vane 47, clockwise, Figure 3. In this movement the clutch actuating lever 59 is raised, and the cable 60a is unwound from the pulley 57.

The exhaust from the high pressure side also takes place through an auxiliary or parallel path open only during the initial part of the clutch engagement movement of vane 47, through the port 38, passages 39 and 35, recess 32 and ports 34, 37, 26, 13, 7, cylinder 2, and line 51 constituting the exhaust path previously mentioned so that the initial engaging movement of the clutch is comparatively rapid but is reduced in speed when the vane 47 passes the port 38 to cut off the auxiliary exhaust path and comes under the control of the bleeder valve in chamber 24. The engagement of the clutch parts is thus effected, rapidly at first, and more slowly thereafter to eliminate any delay due to a previous excess disengagement.

The two regulating screws 65 and 66 for the bleeder valve permit independent regulation of the rate of bleeding or exhaust at initial registration of the slot 11 with chamber 24 and at the maximum advance thereof, with an infinitely variable rate of increase between these positions. This is so because the bleeder valve slopes outwardly from the adjacent face of the valve plate 10, and the rate of escape from the initial registration of the slot 11 is affected by adjustment of the screw 66 which determines the rate of escape after initial uncovering of the chamber 24. Likewise, the final rate of escape is effected by adjustment of the screw 65. The rate of escape is further accelerated during the uncovering of the valve 62 because of the inclined position of the latter whereby it is opening at an increasing rate while the port 11 moves over it.

When the clutch actuator herein described is operated by atmospheric pressure, any delay in the action of the clutch after pressing the manipulator pedal will not stay reduction of pressure at the high pressure side of the vane, inasmuch as this side is immediately connected to the low pressure line as already described. It will be noticed in this connection that exhaustion does not depend on movement of the vane. Thus, when the clutch is released for engagement upon synchronization, the vane advances instantly and freely since the normal high pressure side has become exhausted while the vane was stationary and the exhaust path open.

Due to the fact that the operating pedal 14 is independent of the throttle pedal 16, the former may be depressed to permit engagement of the clutch without accelerating the motor. This property of the device is especially desirable in coasting on hills, when the braking effect of the motor is to be utilized, and is not available in power actuators that are operated directly and solely from the throttle pedal. Also, the same independent actuation of the operating pedal, while the vehicle is travelling on substantially level surfaces, enables the vehicle to travel at the lowest possible speed while in high gear without the clutch becoming disengaged.

In order to render the power device inoperative and place the clutch under the control of a conventional clutch pedal, a lever 73 (Fig. 1) is mounted on a shaft 74 carried by a fixed part of the structure and is formed with a cam member 75 lying directly over the lever 18. The free end of the lever is joined by a wire 76 to the free end of a plunger 77 slidably mounted in the instrument board. Thus, when the plunger is pulled, the lever 73 is rocked, and the cam 75 bears on the lever 18 to give it the same position as that produced by depressing the operating pedal 14. Movement of lever 18 to this position, as previously explained, shifts the valve plate 10 to a position where it cuts off the high pressure and permits the normal functioning of the clutch springs.

Adjacent the power operated clutch lever 59 is a conventional clutch pedal 78 having a lug 79 spaced over and adapted to engage a similar lug 80 carried by the lever 59. Pressure on the pedal 78 causes engagement of the lugs and hence movement of the lever 59 which, as already stated, is connected to the clutch in the manner of a conventional foot-pressure clutch pedal.

This operation is like conventional clutch operation, and during such operation, the operator's foot pressure is opposed by the engagement-causing clutch springs, which, of course, is not particularly to be desired.

In order to operate the clutch pedally, but without the operator's foot pressure being opposed by the engagement-causing clutch springs, a "booster" mechanism is provided. Such mechanism permits the operator's foot pressure to manipulate a valve which opens the power line through the actuator to the clutch, the latter then being operated by the power medium through the actuator under the control of the operator's foot, placed upon pedal 78.

Such mechanism connected to and operated by pedal 78, includes a link 86 connecting pedal 78 to a crank 85, fixed to a shaft 83 (Fig. 1) journalled within the confines of wall 3 and carrying a gear segment 84 meshing with a pinion 82 (Fig. 4) on the end of a spindle 81 in the end of and plugging sleeve 28.

The sleeve 28 has an elongated slot 87 cut therethrough and normally sealed against the shaft 46 as shown in Figure 3. Adjacent the slot, an elongated shallow recess 88 is cut in the outer wall of the sleeve. Elongated ports 89 and 90 are cut through the hollow shaft 46 and have their inner ends spaced so that they may be connected by the recess 88. The ports 89 and 90 are disposed at opposite sides of the movable vane 47.

The initial pressure on the clutch pedal 78 causes hollow sleeve 28 to be turned through the connections 85, 86, shaft 83, gear segment 84 and pinion 82. Since the valve member 29 is secured to the sleeve 28 by a pin 91, this movement brings the port 45 into free communication with the space 43 which is in permanent communication with the inlet line 41 (Figure 5). At the same time, the recess 32 in the periphery of the valve member is moved out of communication with the passages 33, 34, 35 and their associated passages and ports, to cut off the low pressure source from the high pressure side which is otherwise in communication with the low pressure source through the present portion of the valve plate 10. The slot 87 is also brought into register with the port 90, whereby the pressure medium admitted through the port 45 is communicated through the sleeve 28 to the high pressure side of the vane 47.

The vane commences to rotate under pressure, but since the rotation thereof also turns the shaft 46 and tends to advance the port 90 beyond the slot 87, the distance traveled by the vane is determined by the extent of rotation of the sleeve 28 through the pinion 82. Thus, as the sleeve 28 is advanced by foot pressure on the clutch pedal 78, the vane continues to advance in coordination therewith, maintaining a pull on the cable 60a and lever 59 and holding the lug 80 always slightly in advance of the lug 79. It will be seen, therefore, that the clutch pedal 78 requires only sufficient pressure to overcome the pull of a light spring 78a and turn the sleeve 28.

During the advance of the vane 47, the port 90 is out of communication with the recess 88 so that the latter performs no function on this movement. On retraction of the clutch pedal 78 by the action of the auxiliary spring 78a, the sleeve 28 is retracted until the recess 88 connects the ports 89 and 90 thereby opening a path from the high pressure side to the low pressure side of the vane 47. The pressure medium thus flows from the high pressure side through the port 90, recess 88 and port 89 to the low pressure side, thus permitting the clutch spring pressure to rock the clutch lever 59, pull the cable 60a and turn the hollow shaft 46 and vane 47 as previously set forth. If the vane retracts more than the sleeve 28 to a position where the ports 89 and 90 do not register simultaneously with the recess 88, the exhaust is cut off and the vane ceases to move. Thus, the vane moves only in coordination with the rotation of the sleeve 28 in either direction.

In connection with the clutch lever 59 and clutch pedal 78, it will be seen that the power operation initiated at the operating pedal 14 does not actuate the foot pedal 78 but rather the lever 59. This arrangement avoids the hazard present in devices where the power operation pulls the foot pedal and would injure the foot of the operator if it happens to be beneath the foot pedal head.

The unit is preferably attached to lugs 92 on the engine crank case 93, and the attachment may be made by the bolts 94 which secure the plates 4 and 8 to the cylinder 1. When the device is operated by atmosphere as the pressure medium, the inlet line 41 preferably communicates with the upper part of the engine crank case, so that it delivers to the cylinder only clean air charged with sufficient oil vapor from the heated oil in the crank case to lubricate the moving parts.

Figure 9:
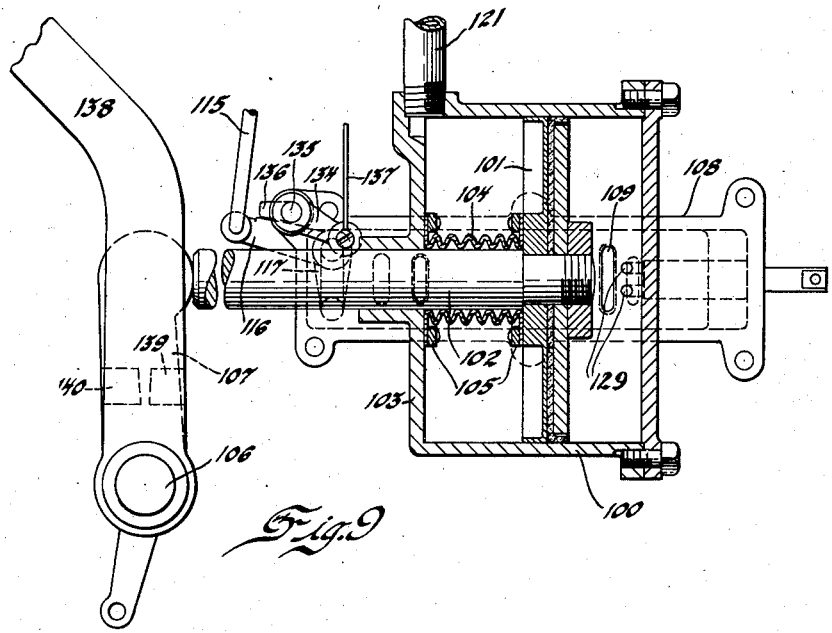
Fig. 9 is a vertical transverse section of a modified construction.
Figure 11:
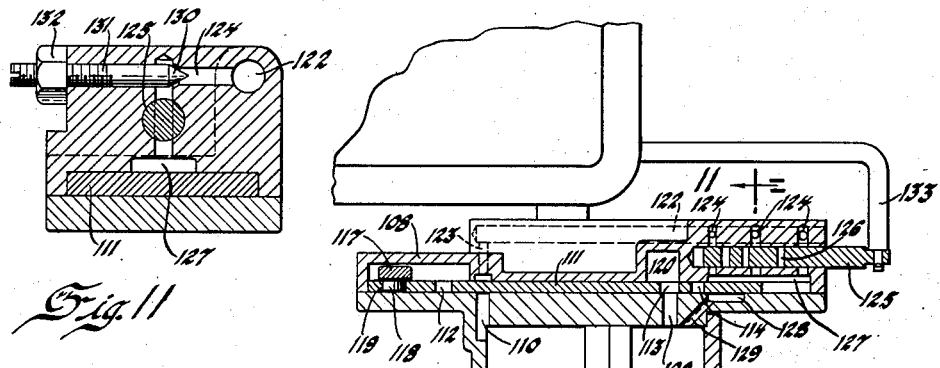
Fig. 11 is a section on the line 11—11 of Fig. 10.
Figure 10:
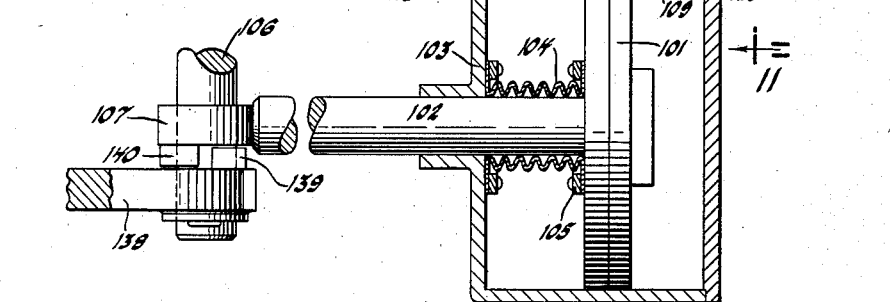
Fig. 10 is a plan section thereof taken through the axis of the cylinder.

In the modification shown in Figures 9, 10 and 11, the body of the device comprises a closed cylinder 100 containing a piston 101 with a piston rod 102 extending therefrom through an end wall 103. Between the piston and this end wall, the rod is surrounded by a bellows type leather seal 104 secured as at 105 to both parts in order to prevent leakage through the wall 103 around the piston rod. A clutch actuating shaft 106 mounted outside the cylinder adjacent the wall 103 and has fixed thereto a lever 107 adapted be engaged by the free external end of the rod 102. Such engagement rocks the shaft 106 and disengages the clutch through suitable linkage (not shown) from the shaft to the clutch.

A valve casing 108 is mounted against the peripheral wall of the cylinder, and adjacent this member, the cylinder wall is formed with an inlet port 109 and an exhaust port 110 therethrough. A valve plate 111 is slidably mounted between the valve casing 108 and the cylinder and is formed with three ports 112, 113 and 114 which function as will presently appear.

The valve plate is shifted by an operating pedal such as the pedal 14 of Figure 1, joined by a link 115 to a crank 116 which in turn carries at its free end a lever 117 having a pin 118 extending into a slot 119 in the valve plate. The valve casing 108 is further formed with an inlet chamber 120 in line with the port 109 and adapted for communication therewith through the port 113.

Fluid under pressure delivered to the chamber 120 is adapted to enter the cylinder at the high pressure side of the piston, while the other or low pressure side is exhausted through a line 121 connected to a source of lower pressure than that which is delivered to the chamber 120. As in the previous construction, the chamber 120 may be connected to the atmosphere and the line 121 to the intake manifold of the engine.

An exhaust conduit 122 is drilled lengthwise through the valve casing 108 and has at one end a branch 123 in line with the port 110. At its other end, the conduit has three branches 124 intersected and governed by a plunger 125 slidable in the valve body and formed with three ports 126 so spaced that only one at a time may be brought into register with a branch 124. The branches 124 lead from the conduit to a chamber 127 formed in the valve body at one end of the valve plate 111. Adjacent this chamber, the wall of the cylinder is formed with a chamber 128 directly adjacent the valve plate and connected to the high pressure side of the cylinder by ports 129.

Each of the branches 124 is traversed by a pointed needle valve 130 threaded at one end as at 131 and adapted to be locked in any position of adjustment by means of a nut 132 on said end. These valves are adjusted in the respective branches 124 with reference to the three gear ratios of a conventional automobile transmission, and the plunger 125 is connected by a rod 133 to the gear shift lever, so that for each gear ratio a port 126 is brought into register with a differently adjusted branch 124. The ports 126 and branches 124 are so arranged or spaced, that two of the ports are independently brought into registration with branches by movement to the right with reference to Fig. 10 while the other port is brought into registration by movement to the left. This arrangement permits the plunger 125 to be connected to a conventional gear shift lever so that upon movement of the latter to a position causing a gear change the plunger moves to a position where one of the ports 126 registers with a branch 124. Therefore different gear change movements of the lever cause registration between different ports and branches.

In operation of the device, with no pressure on the operating pedal, the valve plate 111 is in the position shown in Figure 10, where the port 113 connects the inlet chamber 120 to the high pressure side of the piston through the port 109.

In this position the ports 112 and 114 do not conduct fluid. The piston 101 is moved by the pressure medium towards the left, inasmuch as the left hand side of the cylinder is connected to a source of lower pressure. The rod 102 then engages and moves the lever 107, and the clutch is disengaged.

When pressure is applied to the operating pedal, the valve plate 111 is shifted through the linkage 115—118 to a position where the port 112 connects the port 110 to the branch 123, and the port 114 connects the chamber 128 to the chamber 127 and the branches 124. At the same time, the valve plate 111 cuts off communication between the inlet chamber 120 and the port 109. On moving the gear shift lever the rod 133 moves the plunger 125 so that one of the ports 126 therethrough is in register with a branch 124. The fluid on the high pressure side is thus relieved through ports 129, chamber 128, port 114, chamber 127, one of the branches 124, with the aligned port 126, passage 122, branch 123, ports 112 and 110, and finally through the low pressure side of the piston, to the exhaust line 121. When bleeding starts, the clutch springs will be permitted to throw the clutch into engagement.

It will be seen that the particular port 126 and branch 124 through which the high pressure is relieved, depends on the selected gear ratio in the transmission mechanism, and the rate of exhaust from the cylinder and the rate of engagement of the clutch varies accordingly, inasmuch as flow through the respective branches 124 takes place at different rates because of the predetermined adjustments of the needle valves 130.

As in the previously described construction, the device may be rendered inoperative by means of a lever 134 pivoted as at 135 to a part of the fixed structure and carrying a cam 136 bearing upon the member 116. To the free end of the lever 134 is attached a wire 137 which, when pulled, moves the valve plate 111 through the member 116 to the exhausting position.

A conventional clutch pedal 138 for operating the clutch by foot pressure is rotatably mounted on the shaft 106 and carries a lug 139 adapted to engage a similar lug 140 in a relatively advanced position on the lever 107. Thus, foot pressure on the pedal 138 causes engagement of the lugs 139 and 140 and turns the lever 107 so that the clutch is disengaged through the shaft 106.

It will now be seen that the invention provides a power clutch actuator having the various functions and properties stated in the objects of the invention. It will be understood from the foregoing description of the invention that, in accordance with the principal object, the device is adapted to operate by any fluid pressure medium, gas or liquid, provided only that suitable means is present for establishing a pressure differential. Further in keeping with the stated objects, both the operating pedal 14 and the throttle pedal 16 are operated simultaneously by one foot positioned over both pedals. However, the throttle pedal 16 is operable, independently by engaging the same by the edge of the shoe of the operator, without making contact with the operating pedal 14.

It will further be observed that the power operation is effective on the headless lever 59 or 107 rather than on the clutch pedal 78 or 138 so that there is no danger of injuring the foot of the operator as in the case of other power devices wherein the conventional headed clutch pedal is pulled downwardly with a power impulse at least somewhat greater than the power of the clutch pressure springs. Nevertheless, conventional operation of the clutch is available by foot pressure on the pedal 78, and in this connection the power actuator of Figs. 1 to 8 is caused to function as a booster by the resultant movement of the linkage 86, 85, 83, gearing 84, 82 and sleeve 28 as fully described above.

It will also be seen that the apparatus may be set to an idle position by a pull on the plunger 77 and wire 76, whereupon the cam member 75 or 136 depresses the lever 18 or 116 and shifts the valve plate 10 or 111 to the position wherein it brings the high pressure side of the system into communication with the low pressure side and the exhaust line 51 or 121. Thus the pressure differential necessary for operating the actuator is destroyed and cannot be reestablished until the valve plate 10 or 111 is returned to the position shown in Figure 8 or 10. It will further be seen that the device, when operating by atmospheric pressure, is supplied with air charged with lubricant, due to the connection of the inlet line 41 to the air space of the crank case, with the result that the working parts of the apparatus are lubricated without requiring special attention. Also the air drawn from the crank case is free from foreign matter which might injure or clog the working parts.

It will further be seen that the exhaust side of the actuator is at all times open through line 51. This feature makes the actuator valuable for use with the device of application Serial No. 614,350 filed May 31, 1932.

Further it will be seen that the valves of the actuator are contained in the actuator itself, and are not remote therefrom and connected thereto by complicated, excessive, and expensive piping.

Further, the actuator is so constructed that the pressure medium escapes into the low pressure side of the system, rather than into the atmosphere. This feature is of importance in connection with actuator utilizing a pressure medium which should be conserved, rather than discharged and wasted.

Further, even though the device uses atmosphere as the pressure medium, normal operation does not cause a super-atmospheric pressure to be built up, at any time.

Further, the actuator of Figs. 1–8, being of the rotary vane type, is free of the dirt and dust collecting tendencies inherent to actuators of the reciprocating piston type.

Further, in the actuator of Figs. 9 and 11, the piston rod is connected to the clutch lever directly, and not through flexible connections, such as sometimes prove unsatisfactory.

Now having described the invention it will be understood that the scope of the same is to be determined by the claims, and is not to be limited to the specific embodiments disclosed.

What I claim is:—

1. The combination with a normally engaged clutch and a pedal for operating the same, of a power actuator having a line adapted to be connected to a source of suction and a line connected to atmosphere, valve means for controlling communication between said lines and said actuator, personally operable means for operating said valve means, an auxiliary means of communication, and means for controlling said auxiliary means of communication, said last named means being operable independently of the means for actuating said valve means.

2. The combination with a normally engaged clutch and a pedal for operating the same, of a power actuator having a line adapted to be connected to a source of suction and a line connected to atmosphere, valve means for controlling communication between said lines and said actuator, personally operable means for operating said valve means, an auxiliary means of communication, and means for controlling said auxiliary means of communication, said last named means being connected to and operated by said clutch pedal.

3. In a clutch actuator, a casing, a movable wall dividing the interior of said casing into two parts, a low pressure line in communication with one of said parts, a relatively high pressure line, a valve mechanism adapted in one position to connect the other part to said high pressure line, and in another position to connect said other part to said low pressure line to produce equal fluid pressures on both sides of said pistons, a personal control for said valve mechanism, an auxiliary valve mechanism for connecting said low pressure line to said first named part and said other part to said high pressure line, and separate means for operating said auxiliary valve mechanism.

4. In a motor driven machine having a clutch between the motor and a driven part of the machine and a clutch pedal for manually operating the same, the combination of an actuator for said clutch, a pedal for operating said actuator, a throttle pedal for said motor disposed immediately adjacent said pedal for operating said actuator so that said pedals may be engaged separately or simultaneously by the same foot of the operator, whereby continuous foot pressure, common to both pedals, first actuates the operating pedal and then the throttle pedal, and an auxiliary control for sair actuator connected to and operated by said clutch pedal.

5. In a clutch actuator, a casing, a movable wall dividing the interior of said casing into two parts, a low pressure line in communication with one of said parts, a relatively high pressure line, means connected to said high pressure line including a plurality of independent valve controlled branches, means for independently opening said branches, a valve mechanism communicating with said branches and adapted in one position to connect the other part with said high pressure line through an opened branch and in another position to said low pressure line, and means for operating said valve mechanism.

6. In a clutch actuator, a casing, a movable wall dividing the interior of said casing into two parts, a low pressure line in communication with one of said parts, a relatively high pressure line, means connected to said high pressure line including a plurality of independent valve controlled branches, means for independently opening said branches, a valve mechanism communicating with said branches and adapted in one position to connect the other part with said high pressure line through an opened branch and in another position to said low pressure line, means for operating said valve mechanism, an auxiliary valve mechanism for connecting said other part to said low pressure line, and a pedal for operating said auxiliary valve mechanism.

7. In a clutch actuator, a casing having a dividing wall, a sleeve in said casing, a movable wall on said sleeve and cooperating with said dividing wall to divide said casing into two parts, wall actuating means including a low pressure line, a relatively high pressure line, a valve mechanism for connecting one of said parts to said low pressure line and the other of said parts to said high pressure line, means for personally operating said valve mechanism, an auxiliary wall actuating means comprising a connection between said sleeve and said high pressure line and from said sleeve to said other part, means rendering said auxiliary wall actuating means inoperative after a predetermined movement of said wall, and a valve mechanism for controlling flow through said sleeve.

8. In a clutch actuator, a casing, a movable wall dividing the interior of said casing into two parts, a low pressure line in communication with one of said parts, a relatively high pressure line, means connected to said high pressure line including a plurality of independent valve controlled branches, means adapted to be connected to and operated by a gear shift lever for independently opening said branches, a valve mechanism communicating with said branches and adapted in one position to connect the other part with said high pressure line through an opened branch and in another position to said low pressure line, and means for operating said valve mechanism.

9. In a clutch actuator, a casing, a movable wall dividing the interior of said casing into two parts, a low pressure line in communication with one of said parts, a relatively high pressure line, means connected to said high pressure line including a plurality of independent valve controlled branches, means adapted to be connected to and operated by a gear shift lever for independently opening said branches, a valve mechanism communicating with said branches and adapted in one position to connect the other part with said high pressure line through an opened branch and in another position to said low pressure line, means for operating said valve mechanism, an auxiliary valve mechanism for connecting said other part to said low pressure line, and a pedal for operating said auxiliary valve mechanism.

10. A fluid pressure actuated motor comprising a casing having a dividing wall, a sleeve rotatably mounted in said casing, a second wall carried by said sleeve and cooperating with said dividing wall to divide said casing into two parts, a line adapted to convey fluid under low pressure, a line adapted to convey fluid under pressure higher than that in said low pressure line, a valve mechanism for connecting one part of said casing to said low pressure line and the other part of said casing to said high pressure line, means for operating said valve mechanism, a connection between said sleeve and said high pressure line and from said sleeve to said other part of said casing, and a valve mechanism for controlling flow of fluid through said sleeve.

11. A device of the character described comprising a casing having a dividing wall, a sleeve rotatably mounted in said casing, a second wall carried by said sleeve and cooperating with said dividing wall to divide said casing into two parts, a line adapted to convey fluid under low pressure, a line adapted to convey fluid under pressure greater than that in said first named line, means connecting said first named line to one part of said casing, means separate from said sleeve for connecting said second named line to said sleeve and through said sleeve to the other part of said casing, and a valve mechanism for controlling the flow of fluid through said sleeve.

TRACY BROOKS TYLER.